3,449,301
THIOETHER-BRANCHED, MERCAPTAN-TERMINATED POLYMERS
Raymond F. Noll, North Olmsted, and William J. McCarthy, Avon Lake, Ohio, assignors to The B. F. Goodrich Company, New York, N.Y., a corporation of New York
No Drawing. Filed June 30, 1966, Ser. No. 561,763
Int. Cl. C08d *3/02, 3/06*
U.S. Cl. 260—79                                    1 Claim

ABSTRACT OF THE DISCLOSURE

A trioether-branched, mercaptan-terminated polymer prepared by the pyrolysis of a polymeric bis-xanthate ester. The thioether-branched, mercaptan-terminated polymer is useful as potting and caulking compounds and propellant binders.

---

This invention relates to the preparation of thioether-branched and mercaptan-terminated polymeric materials. More particularly it relates to the conversion of certain unsaturated, liquid polymeric bis-xanthate esters to liquid thioether-branched, mercaptan-terminated polymers by a pyrolysis process.

Liquid mercaptan-terminated polymers are materials of great interest. They respond readily to curing and cross-linking systems, even at room temperatures, and can be used directly in such end uses as potting and caulking compounds and propellant binders. They may be converted to polymeric glycols by reaction with chlorohydrins or reactive cyclic oxides, or they may be employed in condensation reactions or extension reactions to form higher molecular weight polymers. The mercaptan-terminated polymers known in the prior art, such as are exemplified by United States Patent 3,047,544 and copending United States patent application No. 237,375, filed Nov. 13, 1962, now abandoned are essentially linear materials and, when completely mercaptan-terminated, exhibit a mercaptan functionality of approximately 2. This invention teaches the production of thioether-branched mercaptan-terminated polymers having functionalities above 2 and up to about 10 or higher.

Patent application No. 237,375, filed Nov. 13, 1962, is assigned to a common assignee with the present application. At the time the earlier application was filed it was believed that the pyrolysis of either saturated or unsaturated xanthate-terminated esters resulted only in the formation of linear, mercaptan-terminated chains, that is, a linear chain with —SH termination at each end. Analysis of such chains should give a calculated value of —SH per molecule of approximately 2. One material in Example 1 of the earlier application, a polybutadiene xanthate-terminated ester, was pyrolzed 17 minutes at 206° C. and gave a value of 2.34 —SH per mol. This value greater than 2 was believed at the time to be merely the result of experimental error. It was thought that the polymer involved was merely a linear, straight chain, dimercaptan-terminated material.

Further study and analysis of these pyrolyzed xanthate-terminated polyolefins has now led to the conclusion that actually new compositions of matter, namely thioether-branched, mercaptan-terminated materials are produced by the upper range of pyrolysis temperatures from 200° C. to 250° C. when the xanthate-terminated polymer contains double bond unsaturation. The unsaturation points in the polymer chain provide the sites for thioether branching and cross-linking. These higher temperatures pyrolyses produce materials that give —SH per mol of 2 to about 10 and above, and the only reasonable explanation is that the polymer chains have branched by combination of mercaptan groups and double bonds to form thioether linkages so that the polymer molecules have actually more than 2 end points, these end points are all, or nearly all, mercaptan-terminated, and analysis gives the values of —SH per mol greater than 2. This thioether branching reaction increases the molecular weight of the mercaptan-terminated polyolefin as well as its viscosity. Linear xanthate-terminated polymers do not increase in molecular weight when their terminal xanthate groups are converted to mercaptan groups.

Essentially the process of this invention consists of heating unsaturated polymeric bis-xanthate esters prepared in a bulk or, preferably, an emulsion free-radical polymerization system in which a xanthogen disulfide is used as the modifier, until they decompose to form branched chain mercaptan-terminated polymers and gaseous by-product olifin and carbon oxysulfide. The process is similar to that of copending application Ser. No. 237,-375, filed Nov. 13, 1962, but differs from the pyrolytic process disclosed therein in that it is operated at higher temperatures and is employed exclusively on xanthate-terminated polyesters containing points of double bond unsaturation. Analysis and study of the mercaptan-terminated polymers produced (a) by the hydrolysis technique of Patent 3,047,544, and (b) by the pyrolysis technique of this application indicates that method (a) yields essentially linear mercaptan-terminated polymers with a functionality of about 2, while method (b) produces mercaptan-terminated, branched chain thioether polymers with —SH functionalities ranging up to about 2.4 to 10 or so. The properties and analyses of these materials are enough different from those of the materials produced by the method of the prior art, that these new materials are considered to be new compositions of matter. The high temperature pyrolysis treatment of the unsaturated xanthogen disulfide modified polymers is simpler and economically more useful than the hydrolysis process shown by Patent 3,047,544 and unexpectedly produces the new branched chain mercaptan-terminated polymers rather than the linear polymers shown in copending application Ser. No. 237,375, filed Nov. 13, 1962. The pyrolysis process of the invention offers a quality advantage over the process of the patent in that the thioether formation reaction provides a means whereby the functionality of the polymer can be increased beyond two. Tighter, drier cures are therefore made possible. Economic advantages of pyrolysis are indicated because of the rapid reactions involved and the freedom from the necessity of using and recovering solvents.

The monomeric materials employed to make the mercaptan-terminated polymers of this invention contain at least two $CH_2$=C< groups. Representative of monomers of this type are those which form the class of polymers known as diolefins and dienes, particularly aliphatic conjugated diene hydrocarbons including butadiene-1,3, isoprene, piperylene, 2,3-dimethyl butadiene-1,3, pentadiene-1,3,2-neopentyl butadiene, 2-phenyl butadiene and others.

Mixtures of these and other vinyl monomers copolymerizable therewith may also be employed with xanthogen disulfides to form the polymeric bis-xanthate esters. These mixtures include butadiene/styrene, butadiene/acrylonitrile, butadiene/acrylic acid, butadiene/acrylic or methacrylic esters, butadiene/maleic anhydride, isoprene combined with any of the above, and the like. Also useful as comonomers with the preferred unsaturated dienes are chloroprene, halo-styrene, vinyl pyridine, and substituted vinyl pyridines. It is seen that homopolymeric branched chain mercaptan-terminated materials will be formed by this process if only one diene monomer is employed and copolymeric branched chain mercaptan-terminated materials will be formed if two or more copolymerizable monomers are used, one of which is a diene monomer. The most preferred materials are butadiene-1,3 and isoprene.

The xanthogen disulfides used in the practice of this invention to form the bis-xanthate esters of the various polymers and copolymers are normally employed as modifiers, or chain transfer agents, in polymerization. These xanthogen disulfides are represented by the formula:

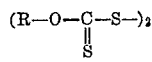

wherein R may be an aliphatic radical preferably of 1 to 12 carbon atoms, such as methyl, ethyl, propyl, isopropyl and lauryl, an aryl radical such as phenyl, tolyl, naphthyl, and the like, an aralkyl radical such as benzyl or an alicyclic radical such as cyclopentyl or cyclohexyl. Typical xanthogen disulfides are diisopropyl xanthogen disulfide, diethyl xanthogen disulfide, dibutyl xanthogen disulfide, diphenyl xanthogen disulfide, di-alphanaphthyl xanthogen disulfide, and dicyclohexyl xanthogen disulfide.

When used as polymerization modifiers to make solid rubbers xanthogen disulfides are employed in relatively small amounts—on the order of 0.5 to 2.5 parts per 100 parts of monomers. In the practice of this invention to form liquid bis-xanthate esters of the polymers, roughly 2 to 20 parts, preferably 5 to 17 parts of xanthogen disulfide are employed. As much as 20 to 30 parts of xanthogen disulfide per 100 parts of monomers may be used, but the bis-xanthate esters thus produced tend to have lower molecular weights than are desired or useful.

Conventional free-radical polymerization systems are employed to make the polymeric bis-xanthate esters. Emulsion polymerization using a dispersion of a surface active soap or emulsifier in an aqueous system to form an emulsion of the monomer is preferred. Techniques of free-radical polymerization systems such as control of time, temperature, concentration and the like are well known. Free-radical initiation is used to start the polymerization reaction.

Those skilled in the art will readily select proper initiators depending upon the monomers employed, and the time and temperature of polymerization used. Various useful and available initiators include p-methane hydroperoxide, hydrogen peroxide, benzoyl peroxide, dicumyl peroxide, tertiary butyl hydroperoxide, potassium persulfate and bis azoisobutyronitrile. Short-stopping of the polymerization at the desired conversion, breaking of the emulsions, and separation of the polymers are steps well known to those skilled in the art.

The polymeric bis-xanthate esters are converted to thioether branched chain mercaptan-terminated polymeric materials by a pyrolysis process involving heating the polymer to such a temperature that the terminal xanthate groups decompose to form terminal mercaptan groups with the liberation of carbon oxysulfide gas and a gaseous olefin corresponding to the alcohol from which the xanthate was derived. Diisopropyl xanthogen disulfide will produce propylene gas, for example. Furthermore, it is now known that the higher pyrolysis temperatures, 120°– 300° C., preferably 180°–220° C., employed in this invention, a terminal mercaptan group of one molecule often reacts with a double bond of another molecule to form a branched molecule through a thioether linkage. It is desirable to run the pyrolysis at as high a temperature as can be achieved within the heating and cooling limitations of the equipment available.

The reduction reactions thought to be involved in the high temperature pyrolysis process of this invention are believed to be exemplified by the following reactions:

(A) 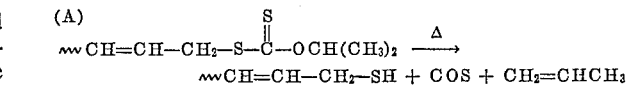

(B) 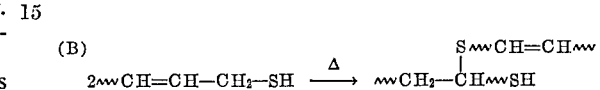

Reaction A, in which xanthate is converted to mercaptan, proceeds at one rate, while Reaction B, in which an unsaturated mercaptan-terminated polymer chain forms thioether linkages and perhaps winds up with branched chain also terminated in mercaptan, proceeds at a second and faster rate. It has been observed that as the temperature increases, both reaction rates increase, which is expected, but the increase in the mercaptan formation rate is faster than the increase in the thioether formation rate, a fact which is not predictable. As thioether linkages continue to form, branching and cross-linking takes place, the polymer viscosity increases, and, ultimately, gelation occurs. If the reaction is continued in an effect to insure that all polymer moleclules have at least dimercaptan functionality, the xanthate content of the polymer must be reduced to essentially zero. By the time this point is reached, the thioether reaction, B, has progressed so far that all polymer molecules have at least dimercaptan polymer mass unworkable. It is therefore desirable to reduce the xanthate content to a minimum and at the same time keep the thioether linkage level as low as possible in order to maintain a low polymer viscosity. The reactions are preferably carried out to the point where mercaptan concentration is a maximum when the reaction temperature is kept constant. It is also desirable that most of the polymer molecules have at least two mercaptan groups and so contribute to chain extension and curing of the polymer. Experience has indicated that a mercaptan level of 2 to 2.4 is the optimum for the obtainment of these conditions.

The first step in preparing the branched chain mercaptan-terminated polymers of this invention comprises the polymerization of at least one monomer containing at least two (CH$_2$=C<) groups in the presence of a xanthogen disulfide to form an unsaturated polymeric bis-xanthate ester which may be represented by the formula

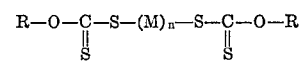

where R is an aliphatic radical of 1 to 12 carbon atoms, an aryl radical, and the like. M is a unit of the monomer employed, in homopolymerizations, and in copolymerization M is the portion of the polymer molecule that contains mol fractions of each combining monomer such that the sum of the mol fractions is equal to one, and $n$ is an integer from 5 to 120, preferably from 15 to 60. If butadiene is employed, M is -(CH$_2$CH=CHCH$_2$)-. If a copolymer of butadiene-acrylonitrile is employed, M is

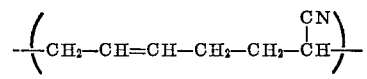

Thioether branching and cross-linking can occur at any of the double bonds in the M grouping. These reactions will increase molecular weight and viscosity.

When the liquid bisxanthate ester is heated at temperatures from 150° C. to 300° C., preferably from 180° C. to 220° C., the terminal xanthate ester groups pyrolyze to mercaptan groups and some of the chains interact to create thioether linkages at the olefinic double bonds. These chain branches can become —SH terminated, and may also in turn become further branched. At the same time gaseous COS and the olefin corresponding to R in the above formula are liberated leaving the branched chain mercaptan-terminated polymer. It has been found advantageous, although not necessary, to carry out this decomposition reaction in the presence of about 0.05% based on the weight of polymeric bis-xanthate ester of a non-oxidizing acid such as phosphoric acid. This acidic material serves to prevent foaming and protects against oxidative chain extension.

In accord with the equations set forth above it is seen that as soon as —SH termination of the unsaturated polymer chain is accomplished, thioether branch formation can occur at the interior points of unsaturation. The product being produced is a liquid material, hence the product viscosity cannot be allowed to become so great that the product ceases to be a liquid, or even if still a liquid; has such a high viscosity that it is not usable in commercial practice. The viscosity of the product depends on length of the polymer chains and the degree of crosslinking between the polymer chains. A plot of percent mercaptan versus reaction time and of polymer viscosity versus reaction time, shows that percent mercaptan first rises to a maximum, then falls off as longer reaction times are employed, while polymer viscosity increases at an increasing rate as reaction time is extended. The point of maximum mercaptan termination occurs at an average value of about 2 —SH per mol of polymer, but at this point the polymer viscosity is not yet high enough to provide a polymer with maximum cure and use properties. As the reaction time is extended, the polymer viscosity rises to its desired value (considerably higher than that produced by a similar linear mercaptan-terminated polyolefin) and the average —SH per mol of polymer increases to about 2.4 or higher, this rise in mercaptan value being due to the interchain cross-linking which is occurring. The polymer viscosity, measured in centipoises at 27° C. with a Brookfield viscometer, No. 7 spindle at 20 r.p.m., should be 20,000–50,000 with 25,000–35,000 cps. a more preferred range. When the pyrolysis temperature is 180° C., the viscosity is increasing at the rate of about 1,000 cps. a minute after the maximum mercaptan termination is reached, and at 200° C. pyrolysis temperature the viscosity is increasing about 5,000 cps. per minute after maximum mercaptan termination is reached.

The pyrolysis time for conversion of xanthate terminated polybutadiene to mercaptan-terminated polybutadiene drops swiftly as temperature of reaction increases. A second factor is that different temperatures actually produce different products. At lower temperatures (below 200° C.) most of the mercaptan formed is converted to thioether linkages. At higher temperatures (above 300° C.) the reaction is complete in a few seconds, the product has maximum mercaptan content, and minimum thioether linkage formation. The liquid polymer made at the higher temperature has a higher mercaptan content and a lower viscosity than a product made at a lower temperature. It is important that when the desired product has been made, as determined by the viscosity measurement, the reaction products be quickly cooled to about 100° C. to prevent the reactions from going further and producing products with lower mercaptan content and higher viscosity than was intended.

Reaction time for the pyrolysis may take about 36 minutes at 200° C. and as little as about 20 seconds at 300° C. It is important to hold the viscosity of the polymer at a level which will permit subsequent processing. Polymer viscosity increases as the conversion to mercaptan-terminated polymer proceeds. Infrared analyses show that useful polymers are obtained when 75% to 90% of the terminal ester groups of the branched chain polyolefins have been converted to terminal mercaptan groups. The liquid, branched, mercaptan-terminated polymers oxidize readily in air, forming gels and weak solid polymers. They can be best preserved by storing in closed containers, free of air.

The liquid unsaturated branched chain mercaptan-terminated polymers prepared by the pyrolysis process of this invention from liquid polymeric bis-xanthate esters are readily converted to non-fluid materials by chemical reaction. This conversion, or curing is considered to be complete when the liquid polymeric material is no longer pourable at room temperature, even though it may still be described as a plastic, self-adherent gum. Any material that will convert these liquid branched chain mercaptan-terminated polymers to non-fluid rubbery materials is considered to be an effective curing agent. It is also possible to continue the pyrolysis reaction to the point where a solid, rubbery, insoluble mass is formed without curative addition. In this manner coating operations such as the coating of metal cans can be performed.

It will be appreciated that the liquid branched chain mercaptan-terminated polymers of this invention are pourable and easily cast into molds, into joints to form cast in place gaskets and into crevices as sealants. They can easily be cast, spread, and coated on laminar sheets of all kinds. Fillers, activators, retarders, curing agents, plasticizers and the like can readily be added to and dispersed in the liquid polymers. Proper control of the amounts of these additives employed enables one to balance working life—that period after the compounding agents are added during which the polymer stays fluid, flowable and moldable—with curing time—the period from the end of working life until the polymer is completely set in its ultimate configuration and is free from cold flow. Sometimes short working life is satisfactory. When a very large or very complicated shape is being formed from the polymer, a long working life may be desired. However, in virtually all cases the shortest possible cure time that will not adversely affect polymer properties is desired. The same ingredients that induce rapid cure may also shorten working life, therefore one must use care in selecting the compounding ingredients and conditions from the wide variety that are available.

Substances that condense with the hydrogen of the mercapto terminal groups are effective curing agents. Generally condensing agents react with the mercapto terminal groups to remove hydrogen and join the sulfur atoms into continuous linkages. Included among available curing agents are oxidizing agents in general—air, oxygen, peroxides, per salts (persulfates and permanganates), polysulfides, aldehydes and ketones. Specific curing agents include lead and zinc peroxides, lead oxide, quinone, hydrogen peroxide, benzoyl peroxide, di-tert.-butyl hydroperoxide and the like. Metal oxide cures can be accelerated by the addition of an inorganic acid such as caproic acid or dodecyl benzene sulfonic acid. Aromatic and aliphatic di- and tri-functional epoxides and isocyanates will serve as curing agents and these cures may be accelerated by the addition of amines [2,4,6-tri(dimethyl)-aminomethyl phenol, triethylene tetramine, diphenyl guanidine] or tin salts [dibutyl tin dilaurate, dibutyl tin dimaleate].

In the cured state, polymers produced by this invention often have the appearance of rubber-like semi-solids and become capable of preserving their dimensions and form substantially without change. They become resistant to relatively extreme temperatures, ozone, and sunlight, and may be insoluble in or not seriously attacked by solvents, oils, greases and dilute aqueous solutions.

Cured materials ranging from soft tacky gums to tough rubbers can be obtained from the liquid branched chain mercapto-terminated polymers. In the higher molecular weight ranges these polymers can be used as binders for transmission belts, linings for tanks, hose and pipe carrying hydrocarbons and paints, as jackets for wire and cable, and for gaskets, washers, packing, and adhesives. Lower molecular weight polymers (from dimers—3,500) find use as coatings, impregnants and adhesives. Lower molecular weight polymers (from poured gaskets and joint sealers.

Low viscosity liquid branched chain mercapto-terminated polymers can be loaded with various fillers such as silica, carbon black, alumina, asbestos, and clay to give them strength and bulk.

The following examples, in which parts are parts by weight unless otherwise indicated, are provided to illustrate the practice of the invention. Brookfield viscosities were run on the undiluted polymer at 27° C. using No. 7 spindles at 20 r.p.m. Average molecular ($\overline{M}_n$) are determined by a modified isopiestic method as described in "Analytica Chimica Acta," vol. 20, No. 6, June, 1959. Sulfur analyses are determined by the Schoeniger oxidation method described in "Mikro Chimica Acta," No. 1, pp. 123–129, (1955) and "Micro Chemical Journal," vol. 4, 77 (1960). Mercaptan analyses are made by iodine oxidation as described in "Quantitative Organic Analyses Via Function Groups," chap. 13, published by John Wiley and Sons, 1949. Cure rating is determined by allowing a mixture of 100 parts polymer, 24 parts 50% lead oxide in dibutyl phthalate and 1 part caproic acid to stand 2 days at room temperature. Shore A durometer hardness is run and reported as $A/B$ where A=instantaneous hardness and B=10 second hardness taken 10 seconds after the instantaneous hardness is read.

EXAMPLE I

The ingredients of the following recipe were charged to a 15 gallon, glass lined reactor equipped with an agitator and with temperature controls. Polymerization temperature was maintained at 30° C. for 40 hours and 75% conversion to polybutadiene was obtained. Molecular weight of the polymer product was 1935, Brookfield viscosity=9,200 cps. at 27° C., percent S=5.86, percent SH=0.10, xanthate groups per molecule (corrected for SH)=1.82.

| Ingredient: | Parts |
|---|---|
| Soft water | 180.0 |
| Butadiene-1,3 | 100.0 |
| Potassium fatty acid soap | 4.5 |
| Sodium salt of condensation product of formaldehyde and beta-naphthalene sulfonic acid | 0.1 |
| Trisodium phosphate .12H$_2$O | 0.5 |
| Sodium hydrosulfite | 0.02 |
| Diisopropyl xanthogen disulfide | 8.0 |
| p-Methane hydroperoxide [1] | 0.21 |
| Sodium formaldehyde sulfoxylate | 0.15 |
| Monosodium ferric ethylenediamine tetraacetate, 13% Fe | 0.015 |
| Equimolar trisodium hydroxyethylethylene diamine triacetate and sodium gluconate | 0.0074 |
| Sodium dimethyl dithiocarbamate shortstop at end of reaction | 0.24 |

[1] Add ½ PMH when reaction first dies (about 30% conversion).

Ten gallons of the polymeric xanthate ester was heated to 180° C., under a vacuum of 28" Hg and held at that temperature for 126 minutes. The unpleasant odor of gaseous COS was emitted indicating breakdown of the xanthate structure to mercaptan. Samples of the pyrolysate were taken at intervals with the results tabulated below:

| Sample | Time for sample (min.) | percent S | Percent SH | Visc. at 27° | Mn | Cure rating |
|---|---|---|---|---|---|---|
| A | 18 | 4.22 | 1.44 | 11,400 | | Syrup. |
| B | 48 | 3.61 | 2.40 | 12,900 | | Soft-sticky. |
| C | 68 | 3.02 | 2.60 | 14,000 | | Soft-fairly dry. |
| D | 90 | 3.00 | 2.83 | 16,400 | | 27.24. |
| E | 105 | 3.33 | 2.76 | 18,200 | | 40.33. |
| F | 120 | 2.96 | 2.65 | 19,800 | | 42.38. |
| G | 126 | 2.82 | 2.60 | 20,800 | 2,810 | 45.39. |

Mercaptan Functionality=2.22 (Sample G).

EXAMPLE II

Preparation of mercaptan-terminated polymer by method of United States Patent 3,047,544

Two parts of the polymeric xanthate ester prepared in Example I were dissolved in 3 parts benzene. One-half part morpholine was added and the mixture was agitated at room temperature for 3 days with a continuous nitrogen purge. The mixture was acidified with hydrochloric acid to precipitate polymer, water washed to neutral pH, methanol washed and vacuum dried. The product analyzed:

| | |
|---|---|
| Brookfield viscosity at 27° C. cps | 10,600 |
| $\overline{M}_n$ | 1920 |
| Percent SH | 3.02 |
| Mercaptan functionality | 2.10 |
| Cure rating | 33/23 |

Comparison of the data developed in Example I by the practice of the process of this invention with that developed in Example II by the process of Patent 3,047,544 shows that the patented process creates little change in viscosity or molecular weight when final product is compared to the polymeric bis-xanthate ester product. The process of the invention develops higher viscosity and higher molecular weight, indicative of the thioether branching and cross-linking. The lowering in —SH content also indicates branching and crosslinking in the process of the invention. The process of the invention develops a higher mercaptan functionality and a significantly higher state of cure. In the invention the capability of cure of these liquid polymers can be controlled by controlling the state of conversion of the polymer to the branched and cross-linked form.

While the examples given illustrates batch pyrolyses of bis-xanthate esters it is fairly simple to set up a continuous pyrolysis unit with liquid bis-xanthate ester flowing in at one point and liquid branched chain mercaptan-terminated polymer flowing out at another. Temperatures for a continuous process range from 210° to 250° C. and residence time in the pyrolysis zone can range from one minute to 5 or 10 minutes.

Depending on the amount of curing agent, curing temperature, and curing time employed, these cured materials can be made to range from soft, tacky, plastic masses to elastic, rubbery materials and to tough, low modulus rubbers. They can be reinforced for better physical properties with clay, carbon black, and the like.

We claim:
1. Compositions of matter formed by the process of pyrolyzing a polymeric bis-xanthate ester of the formula

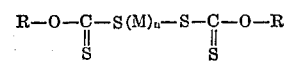

wherein R is selected from the group consisting of aliphatic, aryl, aralkyl and alicyclic radicals, M is a unit of the monomer or comonomers employed in forming said polymeric bis-xanthate ester and is so selected that it represents the polymerization unit of a conjugated, aliphatic diolefin hydrocarbon in homopolymerization and in copolymerization of an aliphatic diolefin hydrocarbon with a vinyl monomer copolymerizable therewith, represents the portion of the polymer molecule that contains mol fractions of each combining monomer such that the sum of the said mol fractions is equal to one, and $n$ is an integer from 5 to 120, at 180° C. to 300° C. for a period of 36 minutes to 30 seconds, the said compositions having Brookfield viscosities measured at 27° C. of 20,000–50,000 cps.

References Cited

UNITED STATES PATENTS 3,047,544  7/1962  Byrd _____ 260—79

OTHER REFERENCES

Nace, Organic Reactions, Vol. 12, p. 58.

Reid, Organic Chemistry or Bivalent Sulfur, vol. IV, pp. 165 to 169 (1962).

DONALD E. CZAJA, *Primary Examiner.*

M. I. MARQUIS, *Assistant Examiner.*

U.S. Cl. X.R.

260—37

PO-1050
(5/69)

UNITED STATES PATENT OFFICE
CERTIFICATE OF CORRECTION

Patent No. 3,449,301                    Dated June 10, 1969

Inventor(s)  Raymond F. Noll and William J. McCarthy

It is certified that error appears in the above-identified patent and that said Letters Patent are hereby corrected as shown below:

Column 1, line 14, delete "trioether" and insert --thioether--
Column 1, line 55, delete "pyrolzed" and insert --pyrolyzed--
Column 2, line 24, delete "olifin" and insert --olefin--.
Column 4, line 32, delete "effect" and insert --effort--;
column 4, line 37, after "that" delete "all polymer molecules have at least dimercaptan" and insert --increased viscosity causes gelation and makes the--.  Column 7, line 19, after "hesives" delete ".  Lower molecular weight polymers (from" and insert --, as caulking and potting compounds, as binders column 7, line 29, after "molecular" insert --weights--; colum 7, line 37, after "via" delete "Function" and insert --Functional--.  Column 8, line 73, that portion of the formul reading $-S(M)_n-S-$ should read $$-S\text{-}(M)_n-S-.$$

Column 10, line 7, delete "or" and insert --of--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents